(12) United States Patent
Duffin (10) Patent No.: US 11,457,612 B2
(45) Date of Patent: Oct. 4, 2022

(54) RETRACTABLE PET LEASH WITH VARIABLE BRAKE

(71) Applicant: Edward Duffin, Toronto (CA)

(72) Inventor: Edward Duffin, Toronto (CA)

( * ) Notice: Subject to any disclaimer, the term of this patent is extended or adjusted under 35 U.S.C. 154(b) by 372 days.

(21) Appl. No.: 16/889,504

(22) Filed: Jun. 1, 2020

(65) Prior Publication Data

US 2021/0368741 A1    Dec. 2, 2021

(51) Int. Cl.
*A01K 27/00* (2006.01)
*B65H 75/40* (2006.01)
*B65H 75/44* (2006.01)

(52) U.S. Cl.
CPC ......... *A01K 27/004* (2013.01); *B65H 75/406* (2013.01); *B65H 75/4442* (2013.01)

(58) Field of Classification Search
None
See application file for complete search history.

(56) References Cited

U.S. PATENT DOCUMENTS

| 3,693,596 | A * | 9/1972 | Croce ................. | A01K 27/004 |
| | | | | 119/796 |
| 11,033,003 | B1 * | 6/2021 | Burkhardt ............ | B65H 75/486 |
| 2007/0131177 | A1 * | 6/2007 | Perkitny .............. | A01K 27/004 |
| | | | | 119/796 |
| 2011/0126778 | A1 * | 6/2011 | Mitchell ............... | A01K 27/006 |
| | | | | 119/796 |
| 2011/0220036 | A1 * | 9/2011 | Matthews .......... | B65H 75/4431 |
| | | | | 119/796 |
| 2017/0142935 | A1 * | 5/2017 | Max ...................... | A01K 27/004 |
| 2020/0154677 | A1 * | 5/2020 | Anderson ............ | B65H 75/406 |
| 2021/0176967 | A1 * | 6/2021 | Colvin ................. | A01K 27/004 |

FOREIGN PATENT DOCUMENTS

DE     102016213670    *  1/2018

\* cited by examiner

*Primary Examiner* — William A. Rivera
(74) *Attorney, Agent, or Firm* — Nasser Ashgriz; UIPatent Inc.

(57) ABSTRACT

The present invention is a retractable pet leash with a variable brake system to control a pet. The variable braking system can be engaged or disengaged by the user via 3 methods. The first method is via a handle that is directly connected to the brake. The second method, also actuated by the user is a one touch brake system that uses the rotation of the reel to slowly apply the variable brake over several rotations of the reel. The third method allows the user to set the length of the leash cord and when the set length of the cord is met, engages the one touch brake system. The retractable pet leash provides a system to set the length of the leash cord being let out and ensures that the leash cord is kept taught between the user and the pet and notifies the user when the set length has been reached and applies variable braking in a steady and predictable manner to smoothly stop the pet.

16 Claims, 10 Drawing Sheets

RETRACTABLE PET LEASH WITH VARIABLE BRAKE

FIELD OF THE INVENTION

The present invention relates in general to retractable leashes for dogs or pets and in specific to controlling a domesticated pet while walking.

BACKGROUND OF THE INVENTION

Leashes for dogs and other pets typically have a hand-held housing containing a reel rotatable mounted in the housing and include a reel and a brake system for controlling unwinding of the reel. Typically, one end of the leash attaches to the collar worn by the pet, and its other end extends through an opening in the housing to connect to the reel, which can rotate in one direction to wind the leash. If the pet pulls the leash, the reel rotates in the other direction to unwind the leash, which builds a tension in a spring inside the reel. The amount of tension on the spring depends on the distance from the reel to the pet. The tension in the spring reduces as this distance reduces, which again winds the leash onto the reel.

Many retractable leashes have a mechanism that locks the leash cord from being let out and/or taken in by push of a button. One issue with such systems is that there may be a slack in the cord, if the pet moves closer than the locked in cord distance. The slack cord can get tangled around obstacles on the ground, or wrapped around the pet or the user. In addition, such stop mechanisms may cause a jerking force on the pet if it is applied as the pet is moving away. In addition, a rapid stop may suddenly pull the user forward, causing injuries to user's back, shoulders and arms. The force may pull the housing from the hand of the user and may cause discomfort and/or injury to the user.

To address the above problems, some retractable leashes have attempted to provide brake actuating designs. For example, in one system, a maximum length can be selected and set by the user for less than the full leash extension to set for a desired retraction length. Other retractable leash designs can prevent slack in the leash cord, by using an on/off stopping system, which still allows the pet to build up momentum before reaching the end of the leash.

There is a need for a leash mechanism to overcome the above issues and improve the safety of the pet and user.

SUMMARY OF THE INVENTION

The present invention is a retractable pet leash with a variable braking system. It comprises a one touch brake system and a novel length control system to improve the safety of the pet and the user.

The retractable leash of the present invention consists of a leash cord retraction reel, a hub brake assembly, a one touch brake system, and a length control system to provide a leash with a variable braking mechanism. The length of the leash can be set, and a variable braking is applied in a steady manner when the set length is reached.

The variable braking system controls the amount of force needed to let out (unreel) the leash cord. It ensures that the leash is kept taught between the user and the pet and allows the leash cord to be let out (unreeled) and taken in (reeled) and storing the unused leash cord within the reel. The braking system of the present invention provides a variable braking system that can slow down the pet over a distance instead of just a dead stop.

The variable braking system can be engaged or disengaged by the user via a handle that is directly connected to the brake, or by one touch brake system also actuated by the user that uses the rotation of the reel to slowly apply the variable brake over several rotations of the reel, or allow the user to set the length of the leash cord and when the set length of the leash cord is met, engage the one touch brake system. The one touch braking system allows the user to automatically apply the variable brake in a steady and predictable manner and set the length of the leash being let out. This system still ensures that the leash cord is kept taught between the user and the pet, it notifies the user when the set length has been reached and applies brake.

The variable braking system of the present invention allows for better and safer control of the pet connected to the leash than the currently available leashes with "a stop system". The variable braking system allows for the pet to be stopped at any speed of the cord being let out and smoothly applies the brake force. This removes the jerking motion and thus removes the strain on the pet's collar and the user's wrist. The brake is applied from no braking force to a full stop as the leash cord is let out.

For safety reasons, especially when users are walking a pet, they need to be able to concentrate on their surroundings to ensure they and their pet are safe. The one touch brake of the present invention removes the need to practice using the variable braking system, allowing the variable braking system to be fully utilized by the first time users. The one touch brake removes the need to concentrate on modulating the brake as the brake is applied just by a simple button press.

The present invention contains a length control mechanism which allows the length of the leash to be selected, while still allowing the retraction system to function, and emits an audible "click" when the set length is reached. Depending on the surroundings and conditions where the pet is being walked, the users may want to safely limit the distance between them and their pet to ensure that the pet is under control and is kept safe.

Current retractable leashes control the cord length by either stopping both the let out and take in features of the retract mechanism digitally which creates slack in the leash cord when the set cord length is not fully taken out. Or, by stopping the let-out feature of the retract mechanism creating an immediate stop to the leash cord being let out. In both cases the leash cord allows the pet to build up momentum, if they begin to run away from the user. The momentum of the pet moving at speed will create a large force that will need to be counteracted when the set length of the leash cord is reached. This large force is hard if not impossible to control in the case of heavier or faster pets and can be a surprise if the users are not watching their pet at all times.

Stopping both the let out and take in features, the slack created when the pet is not at the set length of the leash cord can lead to the following;

The tangling of the leash cord around obstacles which can prevent the retraction function of the leash as the cord will not be able to be fully retract;

A tripping hazard for either the user, other by standards or the pet; or

The slack cord can wrap around the pet or the user which is a major safety concern.

The length control mechanism of the present invention allows the retraction of the leash to be fully functional until the pet reaches the length set by the user. At which time the brake will be applied stopping the cord from being let out. This allows the leash to always be taught between the user and the pet.

The length control mechanism smoothly applies a stopping force that gradually increases as the pet reaches the end of the controlled leash length. This gradual increase in force removes the sudden large force experienced with other retractable leashes. Additionally, the mechanism emits an audible "click" to notify the user that the pet is reaching the end of the controlled length of the leash.

In one embodiment the retractable leash of the present invention is able to signal to a pet to slow down or stop just with a light application of the brake. The one touch braking can be optimized for different models of the design thus accommodating a range of pet types, weights and sizes. Therefore, the design delivers control, safety and comfort with its setting ability to rapidly and easily accommodate specific or changing situations related to the size and temperament of the pet, the size and strength of the user, and the safety conditions of the environment.

An objective of the present invention is to provide a variable brake which allows for the user to apply a low force that just adds tension to the leash cord. This, when a pet is properly trained, can signal to the pet to slow down or stop. Secondly, a pets speed away from the user can be slowed at a rate completely controlled by the user. Thirdly the variable brake allows a pet to be stopped at any speed of the cord being let out.

It is another object of the present invention that allows the retraction mechanism to still function when the leash length has been set. It also notifies the user before the brake is applied at the end of the set length and it gradually applies the stopping force needed, eliminating the sudden jerking of any momentum build up by the pet.

It is another object of the present invention that allows for the pet to be slowed by the user over a set distance. This improves on current retractable leashes, which only allow the reel to rotate or to be stopped. The advantage of slowing the pet over a distance is that it removes the jerking motion and thus the strain on the pet's collar and the user's wrist.

It is further another object of the present invention that, with proper training, a slight application of the brake can signal to the pet to stop moving away from the owner. Braking systems always take some practice to master. The automated brake mechanism of the present invention removes the need for this practice and concentration. Thus, allowing the variable brake to be fully utilized by first time users and for it not to distract the user.

It is another object of the present invention to provide a length setting mechanism that utilizes all the features of the variable braking system. The length control allows the leash to not only keep the cord taught between the user and the pet up to a set distance, but also notifies the user that the set length has been reached and brings the pet to a gradual, controlled stop.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

According to FIGS. 1 to 12 the main parts of the retractable pet leash assembly 100 is disclosed. As shown in FIGS. 1 to 4 the leash assembly 100 comprises a leash casing 101 with an ergonomically designed grip portion 102. In a preferred embodiment, the leash casing 101 comprises of two parts, a right side 103 and a left side 105, that are connected to each other using screws and knots. Other connection means like adhesives, male-female connections and/or any connections known to one having ordinary skill in the art can also be used. The two parts, 103 and 105, are designed to receive various parts of the leash assembly 100.

The leash assembly comprises a leash cord retraction reel 10, a hub brake assembly 20, a one touch brake system 30, and a length control system 40. The leash cord retraction reel 10 is rotatable mounted within the leash casing 101 and is adapted for holding, winding and unwinding the leash cord 12. The reel's rotation is under tension to ensure that the leash cord 12 is kept taught between the user and the pet, and allows the leash cord 12 to be let out (unreeled) and taken in (reeled) storing the unused leash cord 12 within the reel 10.

The hub brake assembly 20 is a braking mechanism which controls the amount of force needed to let out (unreel) the leash cord from the leash cord retraction reel 10. The hub brake assembly 20 slows the rotation of the leash cord retraction reel 10.

The one touch brake system 30 is engaged or disengaged by the user via a button or other similar actuator. The one touch brake system 30 is a control mechanism for the application of the hub brake assembly, and allows for the hub brake assembly 20 to operate over several turns of the reel 10.

The length control system 40 allows the user to set the length of the leash cord 12 as desired. When the length of the leash cord 12 reaches the user set length, the mechanism engages the one touch brake system 30, which will be described later in this application. The length control system 40 activates the one touch brake system 30 at a user set length of the leash cord. The length control system 40 in combination with the one touch brake system 30 activates the one touch brake 30 and then immediately resets it so that it does not interfere with the actuation of the brake or length control system 40.

Figure 1:
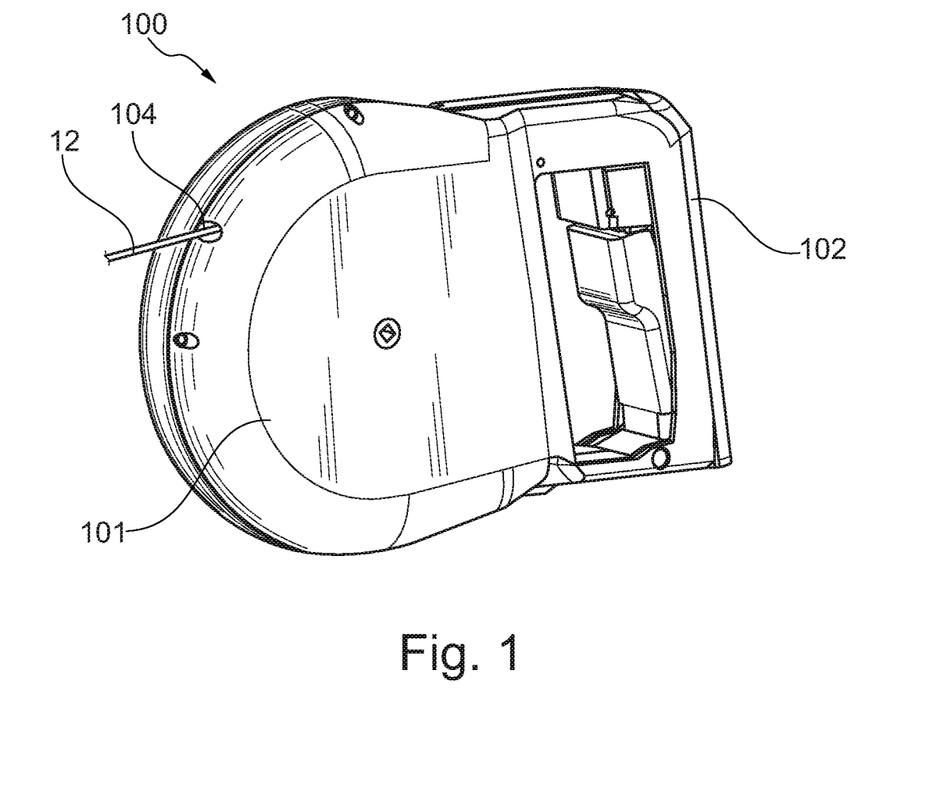
FIG. 1 is a perspective view of the left side of the retractable pet leash of the present invention.
Figure 2:
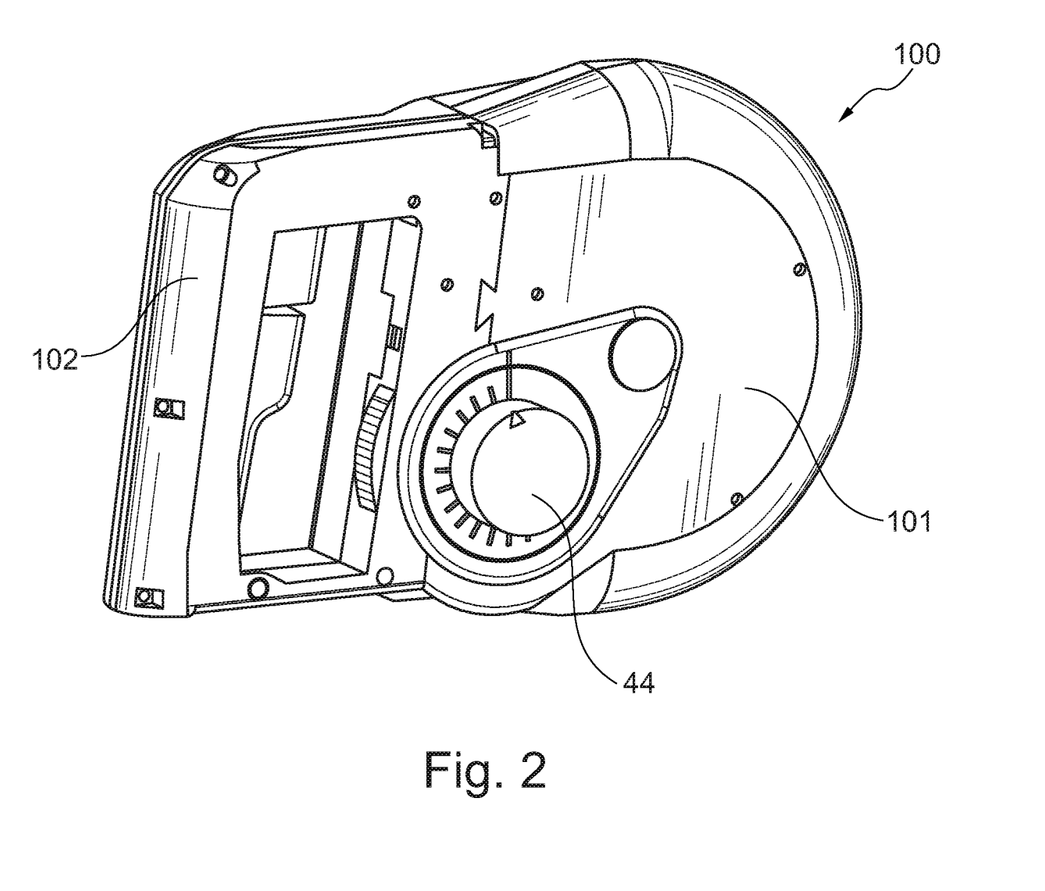
FIG. 2 is a perspective view of the right side of the retractable pet leash of the present invention.
Figure 5:
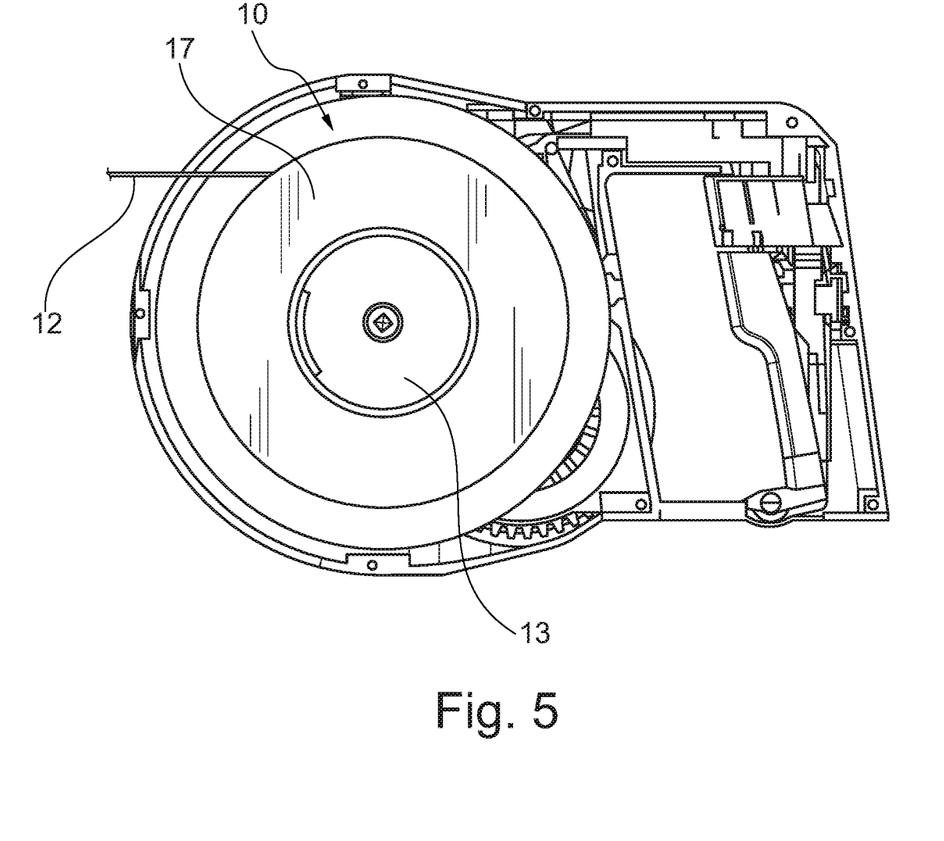
FIG. 5 is a left side view of the components inside the casing shown in FIG. 3 with emphasis on the leash cord retraction reel.

According to FIGS. 1 and 5 the left side of the leash cord retraction reel 10 consisting of a compartment 17 for the leash cord 12 wrapped around it and a return spring 13 to keep tension on the leash cord 12. The leash cord 12 extends through the leash cord hole 104 and connects to a collar of a pet.

Figure 6:
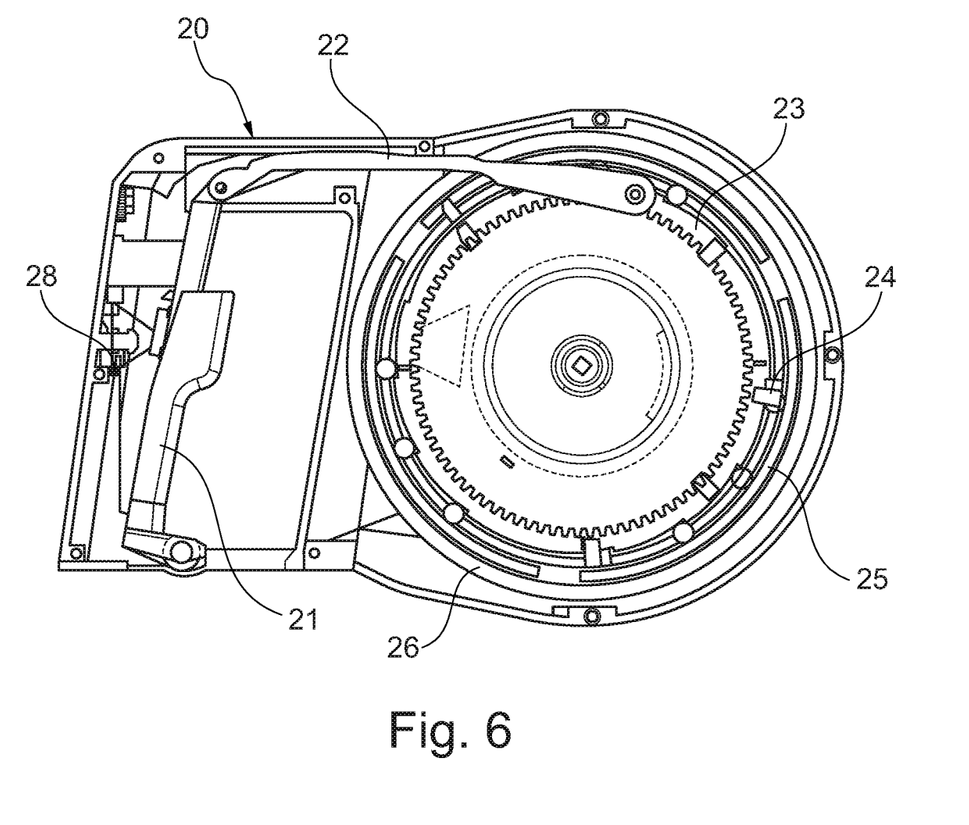
FIG. 6 is a right side view of the components inside the casing shown in FIG. 3 with emphasis on the hub brake assembly.

FIG. 6 shows the hub brake assembly 20 of the present invention 100. The hub brake assembly 20 comprises a handle 21 that is squeezed to change the stopping force of the hub brake assembly 20. The handle 21 is connected to the brake rod 22 that transfers the motion of the handle 21 to the ring gear 23. The ring gear 23 then rotates, forcing the brake pins 24 to rotate between the hub reel 26 and the brake pads 25, where the slopes in the ring gear 23 push the brake pads 25 against the hub reel 26 and create friction between the stationary brake pads 25 and the rotating hub reel 26.

Figure 7:
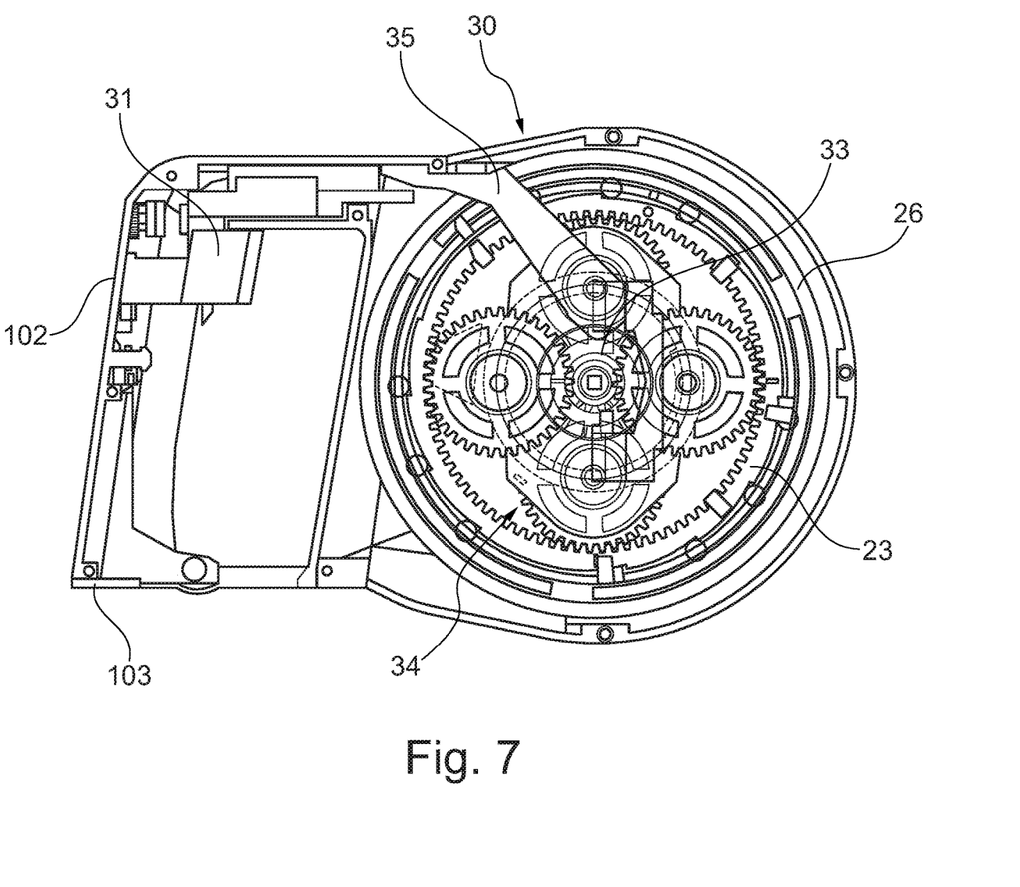
FIG. 7 is a right side view of the components inside the casing shown in FIG. 3 with emphasis on the one touch brake system.

The one touch brake system 30, according to FIG. 7, comprises a button 31 mounted on the grip portion 102. The button 31 when actuated engages the clutch 33 through the clutch Rod 35. The clutch 33 rotationally connects the hub reel 26 to the ring gear 23 through the gear set 34. Once engaged, the rotational motion of the hub reel 26 is significantly reduced through the gear set 34.

Figure 8:
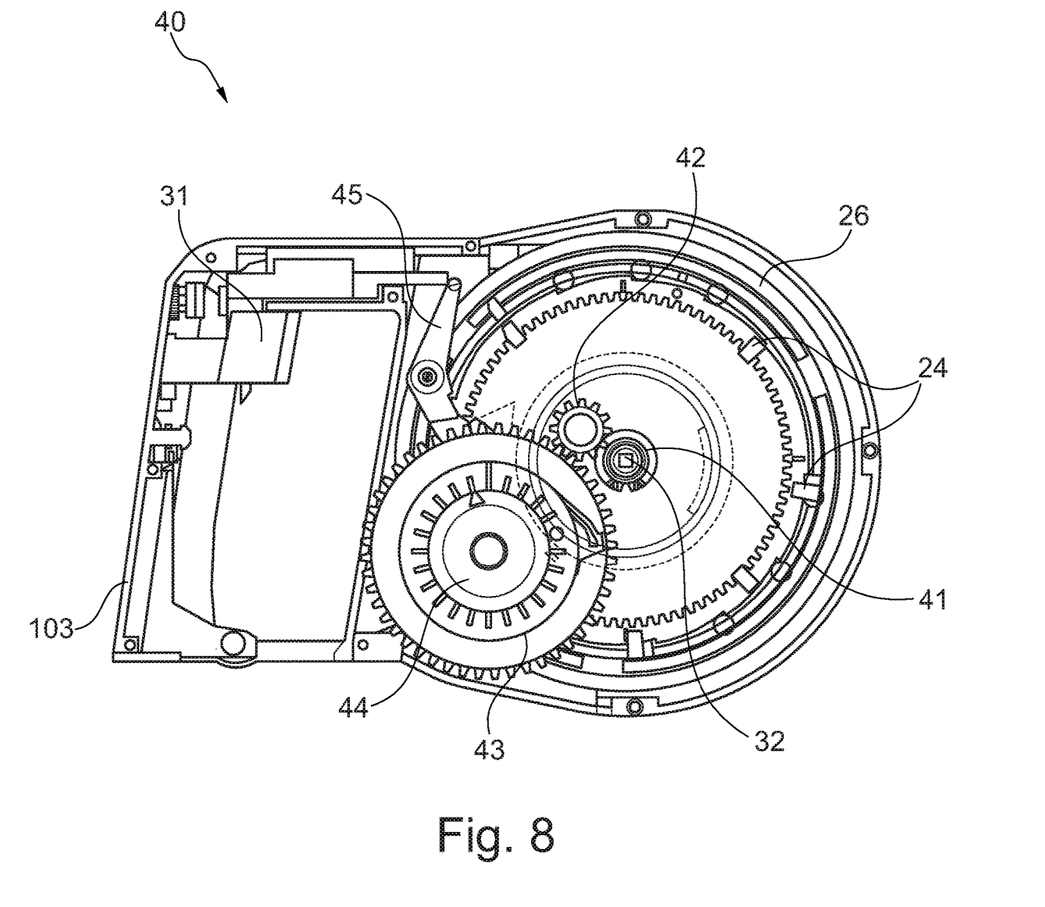
FIG. 8 is a right side view of the components inside the casing shown in FIG. 3 with emphasis on the length control system.

As shown in FIG. 8, the length control system 40 comprises of two index gears 41 and 42 that are connected to the gear shaft 32. The Index gears 41 and 42 take the rotatory motion of the hub reel 26 and index the length indicator 43 several degrees for every full turn of the hub reel 26. The length indicator 43 is then attached to the length adjustment dial 44, which is used by the user to set the desired length of the cord to be let out by the hub reel 26. When the desired length is reached, the length adjustment dial 44, being indexed by the length indicator 43, rotates the brake arm 45, which then actuates the button 31, activating the one touch brake system 30.

Figure 9:
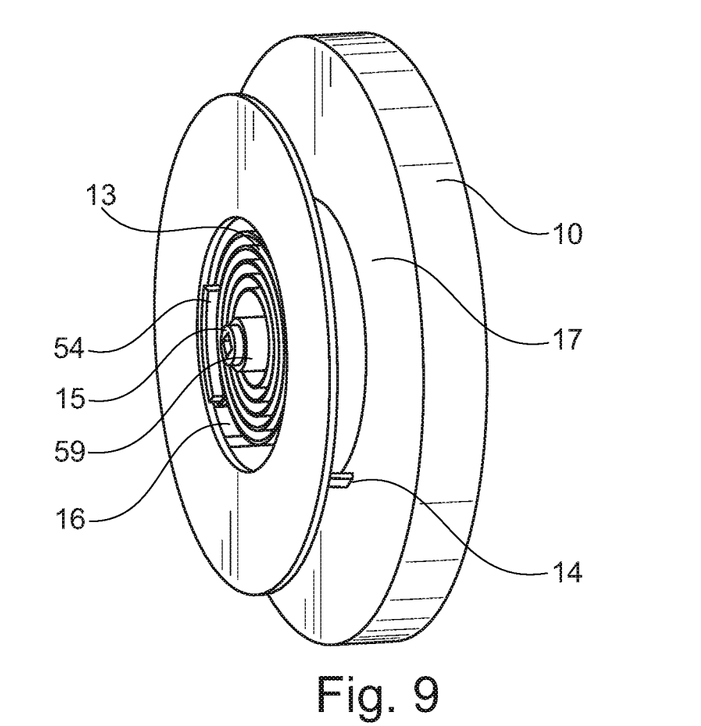
FIG. 9 is a perspective view of the interior mechanism of the left side of the leash cord retraction reel.
Figure 10:
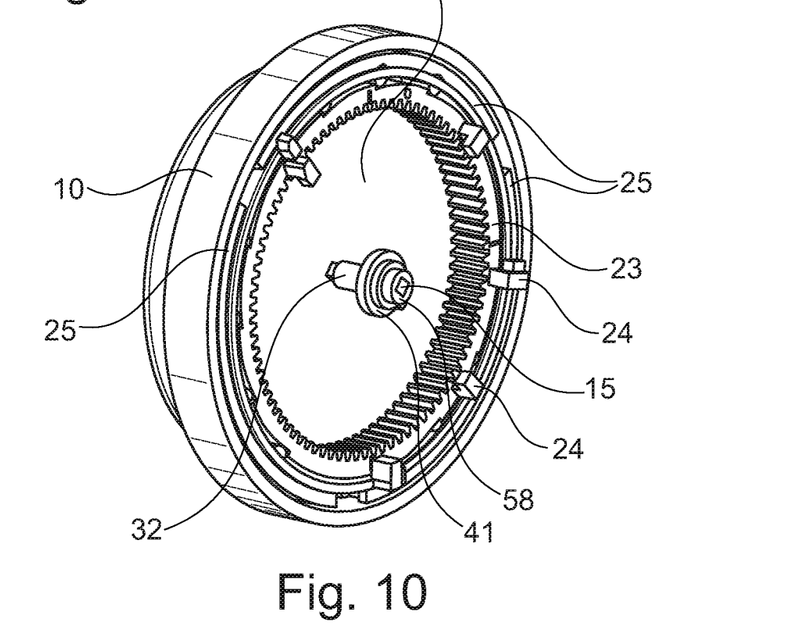
FIG. 10 is a perspective view of the interior mechanism of the right side of the leash cord retraction reel.

FIGS. 9 and 10 show one embodiment of the interior mechanism of the leash cord retraction reel 10. The reel 10 has a cylindrical structure comprising of a first compartment 16 on the left side of the reel 10 designed to contain the return spring 13. The compartment 16 contains a return spring post 54 that the return spring 13 hooks thereon. This causes that the return spring 13 transfers its stored rotational force to keep the leash cord retraction reel 10 and thereby the leash cord 12 under tension.

The leash cord retraction reel 10 further has a second compartment 17, which is axially cut into the leash cord retraction reel 10. The second compartment 17 contains the leash cord 12, which is coiled up around the main cylinder within the compartment 17. There is also a leash cord eyelet 14 tie off point for one end of the leash cord 12, with the other end going through the leash cord hole 104 in the main leash casing 101.

The leash cord retraction reel 10 further has a third compartment 18 on the opposite end to the return spring 13 on the cylinder. This compartment 18 houses the ring gear 23, the inside diameter of which is the frictional contact surface for the brake pads 25. The leash cord retraction reel 10 connects to the first index gear 41 of the length control system 40. This connection allows the rotation of the reel 10 to be translated to the Index Gear 41.

The mechanism of the hub brake assembly 20, in combination with other components, provides a system to slow a pet movement before bringing the pet to a stop. This prevents any jerk action, which can be applied at any speed of the leash cord 12 being let out of the retractable pet leash 100.

The leash cord retraction reel 10 further has two main bearings 58 and 59 on either side of the cylinder. These bearings, 58 and 59, allow the reel 10 to rotate freely within the main leash casing 101. The hub brake assembly 20 allows the leash cord retraction reel's 10 rotation to be slowed and stopped. Referring to FIGS. 6 to 10, again, this is controlled by the brake handle 21. The brake handle 21 is hinged on the lower back of the main leash casing 101, creating a lever at the top of the brake handle 21. A compression spring 28 is employed between the back of the main leash casing 101 and the brake handle 21 to return the brake handle 21 to its home position when it is not being squeezed. When the brake handle 21 is activated, it moves the brake rod 22 linearly, which in turn is connected to the ring gear 23 that is rotated several degrees by the actuation of the brake handle 21.

The brake handle 21 also has a touch latch mechanism that keeps it fully engaged when it is squeezed all the way to its fully applied position. This latch mechanism releases the brake handle 21 with a secondary squeeze. The ring gear 23 has gear teeth around its inner diameter, which interfaces with the gear sets 34 of one touch brake system 30. This interface allows the ring gear 23 to rotate around it's center smoothly. There are several slopes around the outer diameter of the ring gear 23, while the sides of the ring gear 23 are flat.

The outer slopes of the ring gear 23 have brake pins 24 that roll against them with the outside of these brake pins 24, on the opposite side of the ring gear 23, rolling against several brake pads 25. the brake pins 24 are held in place by the brake pin skeleton and the brake pads 25 are sandwiched between the ring gear 23 and the inner diameter of the leash cord retraction reel 10. The brake pin skeleton is also spring loaded to keep a light rotational pressure on the brake pins 24 in the opposite rotational direction of the ring gear's 23 rotation when the brake is applied.

The ring gear 23, brake pins 24 and brake pin skeleton assembly allow the brake pads 25 to apply pressure against the leash cord retraction reel 10 creating friction. This results in a stopping force to the rotation of the reel 10 with a light reverse pressure ensuring that the brake pads 25 are fully retracted when the ring gear 23 is not being actuated and the brake handle 21 is in its home position.

Figure 3:
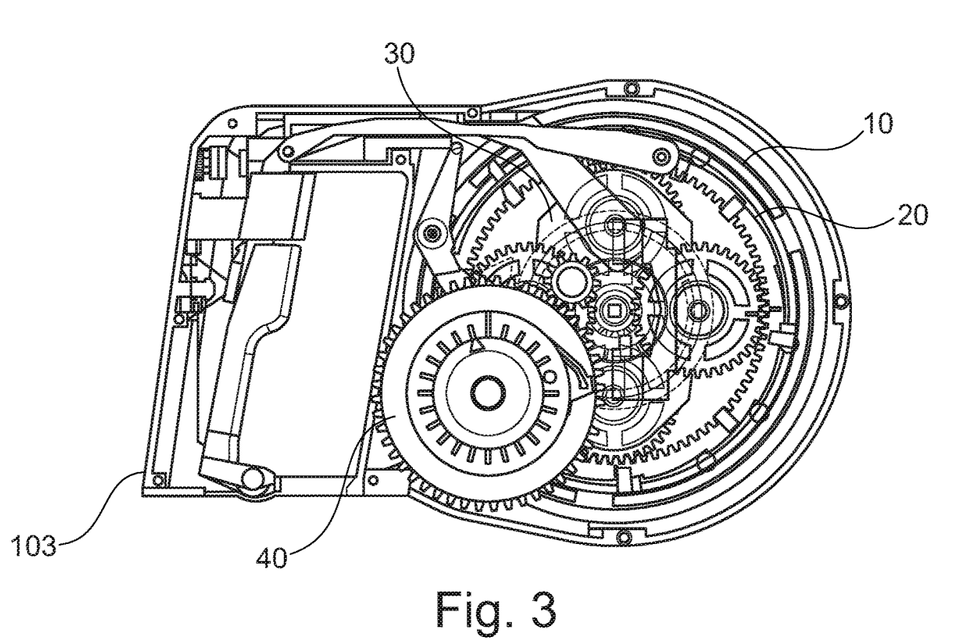
FIG. 3 is an interior view from the right side of the casing.
Figure 4:
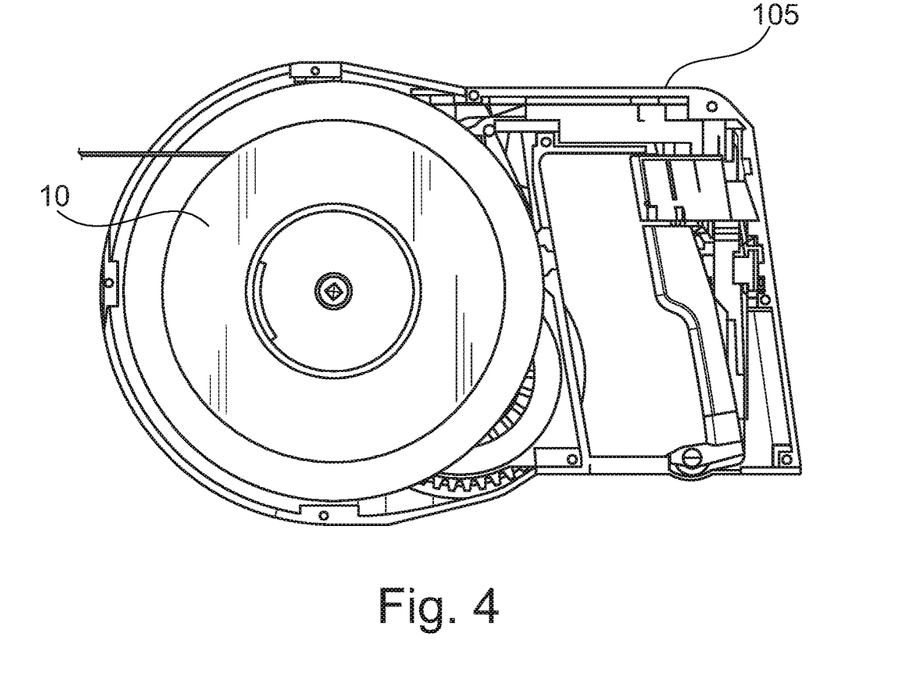
FIG. 4 is an interior view from the left side of the casing.
Figure 11:
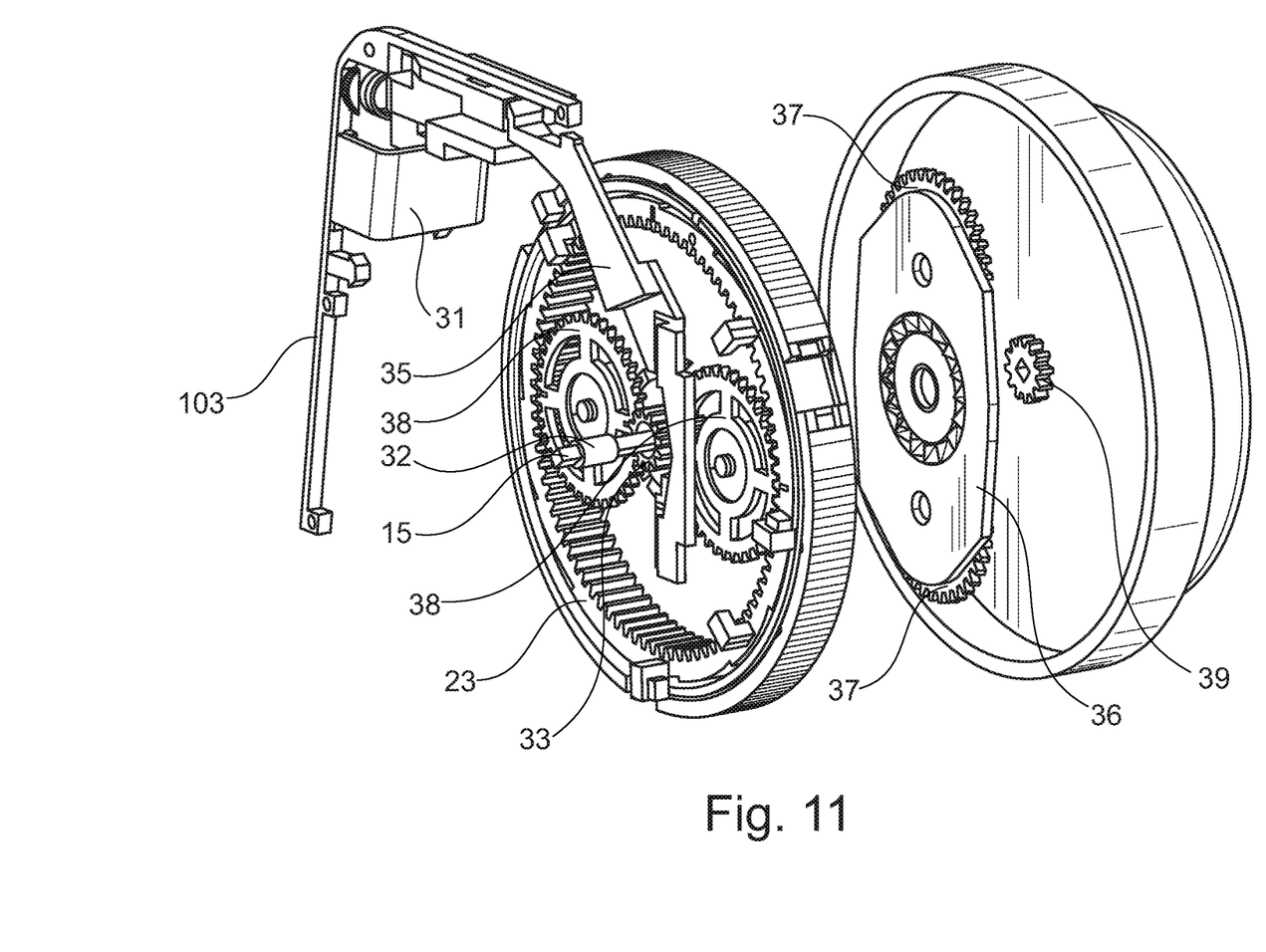
FIG. 11 is a perspective view of the interior mechanism of one touch brake system with emphasis on the gear set.

According to FIGS. 3 and 11 the one touch brake system 30, when activated via the button 31, connects the rotation of the leash cord retraction reel 10 to the hub brake assembly 20 and thus applies the hub brake assembly 20 fully over several turns of the reel 10. To engage the one touch brake system 30, the button 31 is pulled back towards the back of the retractable pet leash 100 and latches into place. The button's 31 pull motion is translated to the clutch rod 35 in a linear direction.

The clutch rod 35, at the opposite end of its connection with the button 31 has a 45-degree slope and is at 90 degrees to the activation motion. This 45-degree slope mates against another stationary 45-degree slope, which is part of the main leash casing 101. These slopes add a horizontal motion tangential to the linear action of the clutch rod 35 being pulled. This horizontal motion pushes the end, with the 45-degree angle, of the clutch rod 35 against the clutch 33 engaging it against the planet arm 36 of the gear set system 34.

The gear set system 34 consists of 2 sets of planetary gears 37 and 38 aligned along the gear shaft 32. The gear set system 34 starts with a sun gear 39 that is part of the leash cord retraction reel 10 and thus rotates with it along the axis of the main shaft 15. The first set of planetary gears 37 are then driven from sun gear 39. The first set of planetary gears 37 also mesh into the ring gear 23 and are held in place by the planet arm 36. The planet arm 36 is free to rotate around the gear shaft 32 and has notches that interface and connect the rotational force of the planet arm 36 to the clutch 33 when it is activated. When the clutch 33 is not engaged, the first set of planetary gears 37, outlined above, are free to rotate, although being connected to the ring gear 23. The rotation of the hub brake assembly 20 just rotates the planet arm 36 and thus translates no force to the ring gear 23.

When the clutch 33 is engaged, via the clutch rod 35, it transfers the rotational force from the planetary arm 36 to the second set of planetary gears 38 because the clutch 33 also has a sun gear as part of its construction. The second set of planetary gears 38 are allowed to rotate around their axis but are otherwise kept in position by the leash frame 103, which is attached to the main leash casing 101. The second planetary gears 38 then mesh with the ring gear 23.

The double planetary gear sets 37 and 38 have the effect of translating and reducing the rotation of the leash cord retraction reel 10 so that a full rotation of the reel 10 only rotates the ring gear 23 several degrees. Thus, the gear reduction connection allows the rotation of the leash cord retraction reel 10 to apply the hub brake assembly 20 over a set amount of the leash cord 12 being let out.

Figure 12:
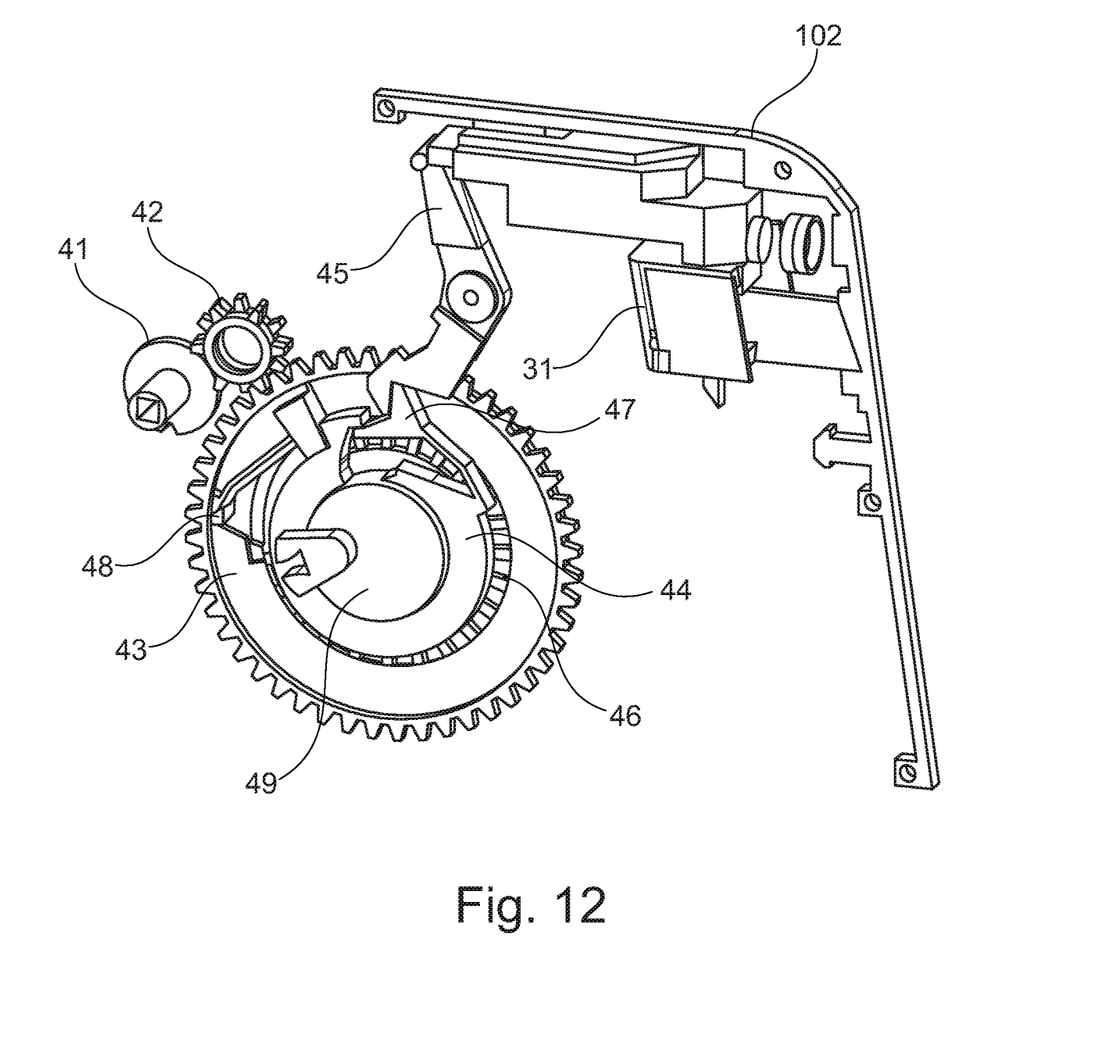
FIG. 12 is a perspective view of the length control system showing the adjustment dial assembly of the present invention.

According to FIGS. 1 and 12 the length control system 40 is used to automatically activate the one touch brake system 30 via it's button 31. The length control system 40 is activated by first index gears 41 and second index gear 42. Index gear 41 is connected to the main shaft 15. Index gear 42 is allowed to rotate freely along its axis and is held in place by the leash frame 103. which is attached to the leash housing 101. The first index gear 41 and the second index gear 42 teeth are cut in such a way as to rotate second index gear 42 several degrees for every full rotation of index gear 41 and hold index gear 42 from rotating along its axis otherwise. This indexing motion of index gear 42 is then translated to the length indicator 43 which has gear teeth around its outer diameter.

In the hollow center of the length indicator 43, there is the length adjustment dial 44. This dial has adjustment dial teeth 46 around its outer diameter, which interfaces with the length indicator 43. The length adjustment dial 44 is held in place by the length adjustment hub 49, which is attached to the main leash casing 101. The length adjustment hub 49 allows the length adjustment dial 44 to freely rotate as well as slide parallel to its rotation around the length indicator 43. This parallel sliding motion allows the length adjustment dial 44 to be placed into two positions. The first non-activated position connects the rotation of the length indicator 43 to the length adjustment dial 44 using the adjustment dial's teeth 46. The second, activated position disconnects the adjustment dial's teeth 46 thus allowing the length adjustment dial 44 to be freely rotated and positioned by the user.

The function of the length adjustment dial 44 is for its dial activation tooth 48 to interface with the brake apply arm 45 at a position set by the user, which in turn sets the length of the leash cord 12. The brake arm 45 is attached to the leash frame 102 and is allowed to rotate. When the length adjustment dial 44 reaches its set position, the user set length, the following actions take place in a single index rotation of the length adjustment dial 44. First, the dial activation tooth 48 presses against one end of the brake arm 45, rotating it several degrees. This rotational force is translated against the button 31 at the opposite end of the brake arm 45. This force moves the button 31 back in a linear motion activating the one touch brake system 30. Secondly, the rotation makes an audible "click" sound to notify the user that the one touch brake system 30 has been applied. Thirdly, the dial activation tooth 48 rotates past the brake arm 45 allowing both the brake arm 45 and the button 31 to no longer be connected to the dial activation tooth 48.

The dial activation tooth 48 is also designed in such a way as to only activate the brake arm 45 in the apply direction. When rotating in the opposite direction the dial activation tooth 48 does not apply the brake arm 45 and thus the button 31. The length indicator 43 also has a similarly designed indicator activation tooth 47 with the same function as the dial activation tooth 48. However, it only activates the button 31, and therefore, the one touch brake system 30 when all of the leash cord 12 is let out.

First, the indicator activation tooth 47 presses against one end of the brake arm 45 rotating it several degrees. This rotational force is translated against the button 31 at the opposite end of the brake arm 45. This force moves the button 31 back in a linear motion activating the one touch brake system 30. Secondly, the rotation makes an audible "click" sound to notify the user that the one touch brake system 30 has been applied. Thirdly, the indicator activation tooth 47 rotates past the brake arm 45 allowing both the brake arm 45 and the button 31 to no longer be connected to the indicator activation tooth 47. Therefore, the index feature of the present invention does not apply the brake until the set length of the retractable pet leash 100 is met, thus ensuring that the leash cord 12 is taught between the pet leash and the pet.

The indicator activation tooth 47 is also designed in such a way as to only activate the brake arm 45 in the apply direction. When rotating in the opposite direction the indicator activation tooth 47 does not apply the brake arm 45 and the button 31.

The length of cord needed to apply the brake can be optimized for different pet sizes and weights in the form of different leash assemblies that have different gearing sets to ensure that the smooth brake application is tailored to various categories of pet and pet size. The present invention can further accommodate settings for different users.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:
1. A retractable pet leash comprising:
a) a leash casing comprising a right side, a left side, a front side, a back side, a top side and a bottom side;
b) a grip portion on the back side of the leash casing having a button with a latch mechanism enabling a user to grasp and control the retractable pet leash;

c) a leash cord that extends through a leash cord hole and connects to a collar of a pet;
d) a variable brake system comprising:
  i. a leash cord retraction reel mounted within the leash casing and rotatable along an axis of a main shaft, wherein the rotation of the leash cord retraction reel is under tension to ensure that the leash cord is kept taught between a user and a pet and allows the leash cord to be unreeled or reeled storing an unused leash cord within the leash cord retraction reel;
  ii. a hub brake assembly comprising a brake handle connected to a ring gear and wherein when the brake handle is squeezed from a first home position, a brake force transfers to the ring gear and rotates the ring gear, forcing a set of brake pins to rotate between a hub reel and a set of brake pads and pushing the set of brake pads against the hub reel to create friction between the set of brake pads and the hub reel, said set of brake pads are further sandwiched between the ring gear and the leash cord retraction reel and apply pressure against the leash cord retraction reel, creating a friction and thereby a stopping force to the rotation of the leash cord retraction reel, controlling the amount of force needed to unreel the leash cord from the leash cord retraction reel and slow the rotation of the leash cord retraction reel;
  iii. a one touch break system comprising a clutch rod to engage the button to a clutch when the button is actuated and wherein the clutch rotationally connects to the ring gear through a gear set, thereby the rotational motion of the hub reel is significantly reduced through the gear set and as the hub reel rotates, a force is slowly applied over several full rotations of the hub reel, the one touch brake apply system when activated via the button, connects the rotation of the leash cord retraction reel to the hub brake assembly and applies the hub brake assembly fully over several turns of the reel, allowing the leash cord retraction reel's rotation to be slowed and stopped;
  iv. a length control system comprising a set of index gears connected to a gear shaft and take the rotatory motion of the hub reel and index a length indicator several degrees for every full turn of the hub reel, the length indicator is attached to a length adjustment dial to set a user set length of the leash cord to be let out by the hub reel and when the user set length is reached the length adjustment dial, being indexed by the length indicator and rotates a brake arm and actuates the button, and automatically activates the one touch brake system when the user set length is reached,
Whereby the variable braking system can slow down the pet over a distance instead of just a dead stop and allows the user to automatically apply the variable brake in a steady and predictable manner and set the length of the leash being let out ensuring that the leash cord is kept taught between the user and the pet.

2. The retractable pet leash of claim 1, wherein the one touch brake system is activated by pressing the button back towards the back side of the leash casing and latch into place.

3. The retractable pet leash of claim 1, wherein the button is unlatched by the user or when the brake handle is slightly applied.

4. The retractable pet leash of claim 1, wherein the press motion of the button is translated to the clutch rod in a linear direction.

5. The retractable pet leash of claim 1, wherein the leash cord retraction reel comprising:
a) a first compartment to contain a return spring and a return spring post;
b) a second compartment that is axially cut into the leash cord retraction reel and contains the leash cord, and
c) a third compartment that contains the hub brake assembly.

6. The retractable pet leash of claim 1, wherein the brake handle is hinged connected to the bottom back side of the leash casing creating a lever at the top side of the leash casing, the brake handle has a touch latch mechanism to be squeezed from the first home position to a fully applied second position, and a compression spring located between the brake handle and the back side of the leash casing.

7. The retractable pet leash of claim 1, wherein the brake handle is connected to the ring gear by a brake rod.

8. The retractable pet leash of claim 1, wherein the ring gear has an inner diameter and an outer diameter and wherein the ring gear has a plurality of gear teeth around its inner diameter and the set of brake pins are installed on its outer diameter rolling against the set of brake pads, and wherein the set of brake pins allow the set of brake pads to apply pressure against the leash cord retraction reel, ensuring that the set of brake pads are fully retracted when the ring gear is not being actuated and the brake handle is in the first home position.

9. The retractable pet leash of claim 1, wherein the brake set of brake pins are mounted on a set of brake pin skeleton creating a brake pin assembly, and wherein the brake pin assembly is spring loaded to keep a light rotational pressure in the opposite direction of the ring gear.

10. The retractable pet leash of claim 1, wherein the clutch rod has a distal end and a proximal end, connected to the button on its distal end and to the clutch at its proximal end, and wherein the clutch rod at its proximal end connection with the clutch has a first 45-degree slope that is 90 degrees to the activation motion and mates against a second stationary 45-degree slope which is part of the leash casing, adding a horizontal motion tangential to the linear action of the clutch rod being pulled.

11. The retractable pet leash of claim 1, wherein the gear set consists of a first set of planetary gears, a second set of planetary gears aligned along the gear shaft and a sun gear that is part of the leash cord retraction reel and rotates with the leash cord retraction reel along an axis of the main shaft, the first set of planetary gear mesh into the ring gear and held in place by a planet arm, the planet arm rotates freely around the gear shaft and has notches that connects the rotational force of the planet arm to the clutch when it is activated and when the clutch is not engaged the first set of planetary gears are free to rotate although being connected to the ring gear; when the clutch is engaged, via the clutch rod it transfers the rotational force from the planetary arm to the second set of planetary gears, the second set of planetary gears are allowed to rotate around their axis and mesh with the ring gear, the rotation of the hub brake assembly just rotates the planetary arm and thus translates no force to the ring gear;
  whereby translating and reducing the rotation of leash cord retraction reel significantly so that a full rotation of the leash cord retraction reel only rotates the ring gear several degrees, thereby the gear reduction connection allows the rotation of the leash cord retraction reel to apply the hub brake assembly over a set amount of the leash cord being let out.

12. The retractable pet leash of claim 1, wherein the set of index gears comprising a first index gear and a second index gear, the first Index gear is connected to the main shaft of the leash cord retraction reel and the second Index gear rotates freely along its axis and have teeth cut around its outer diameter while the first index gear has a single teeth in its outer diameter in such a way that by several rotation of the second index gear the first index gear makes a full rotation and holds the second index gear from rotating along its axis, the indexing motion of the second index gear is then translated to a length indicator which has a set of gear teeth around its outer diameter.

13. The retractable pet leash of claim 1, wherein the length adjustment dial comprises a set of adjustment dial teeth around its outer diameter which interface with the length indicator, and wherein the length adjustment dial is held in place by a length adjustment hub that allows the length adjustment dial to freely rotate or slide parallel to its rotation around the length indicator,
whereby allowing the length adjustment dial to be placed into a non-activated position or an activated position.

14. The retractable pet leash of claim 13, wherein the non-activated position connects the rotation of the length indicator to the length adjustment dial using the set of adjustment dial teeth and the activated position disconnects the set of adjustment dial teeth allowing the length adjustment dial to be freely rotated and positioned by a user.

15. The retractable pet leash of claim 1, further including a notification system as an audible sound to notify the user that the one touch brake system is applied, wherein when the length adjustment dial, interface with the brake arm at the user set length and the length adjustment dial reaches the user set length, a dial activation tooth rotates the brake arm several degrees, thereby moving the button back in a linear motion, activating the one touch brake system and the rotation makes an audible "click" sound, the dial activation tooth rotates past the brake arm allowing both the brake arm and the button to no longer be connected to the dial activation tooth, the dial activation tooth activates the brake arm in the apply direction and the length indicator activates the button and when the leash cord is fully paid out, an indicator activation tooth presses against the brake arm rotating it several degrees, the rotational force is translated against the button and moves the button back in a linear motion activating the one touch brake system, the rotation makes an audible "click" sound and the indicator activation tooth rotates past the brake arm allowing both the brake arm and the button to no longer be connected to the indicator activation tooth.

16. The retractable pet leash of claim 1, wherein the leash cord retraction reel has a set of bearings to allow the leash cord retraction reel to rotate freely within the leash casing.

* * * * *